(12) United States Patent
Dong et al.

(10) Patent No.: US 9,208,751 B2
(45) Date of Patent: Dec. 8, 2015

(54) GPU-BASED LCD DYNAMIC BACKLIGHT SCALING

(71) Applicant: Samsung Electronics Co., Ltd., Suwon-si, Gyeonggi-do (KR)

(72) Inventors: Mian Dong, Houston, TX (US); Xin Zhao, East Setauket, NY (US); Felix C. A. Fernandes, Plano, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 92 days.

(21) Appl. No.: 13/973,577

(22) Filed: Aug. 22, 2013

(65) Prior Publication Data

US 2014/0055504 A1     Feb. 27, 2014

Related U.S. Application Data (60) Provisional application No. 61/693,151, filed on Aug. 24, 2012.

(51) Int. Cl.
| | |
|---|---|
| *G09G 5/10* | (2006.01) |
| *G09G 3/34* | (2006.01) |
| *G09G 5/36* | (2006.01) |
| *G06F 3/14* | (2006.01) |

(52) U.S. Cl.
CPC ............. *G09G 5/10* (2013.01); *G09G 3/3406* (2013.01); *G09G 5/363* (2013.01); *G06F 3/14* (2013.01); *G09G 2320/0606* (2013.01); *G09G 2320/0646* (2013.01); *G09G 2330/021* (2013.01); *G09G 2360/16* (2013.01)

(58) Field of Classification Search
CPC .......... G09G 3/34–3/3426; G09G 2310/0237; G09G 2310/024; G09G 2320/0233; G09G 2320/062–2320/0653
USPC ......................................... 345/102, 690, 204
See application file for complete search history.

(56) References Cited

U.S. PATENT DOCUMENTS

| | | | | |
|---|---|---|---|---|
| 6,271,825 | B1* | 8/2001 | Greene et al. ................. | 345/694 |
| 7,986,325 | B1* | 7/2011 | Gold et al. ..................... | 345/506 |
| 2005/0057485 | A1 | 3/2005 | Diefenbaugh | |
| 2006/0034510 | A1* | 2/2006 | Kim .............................. | 382/168 |
| 2007/0127814 | A1* | 6/2007 | Fluck et al. ................... | 382/171 |
| 2008/0150880 | A1* | 6/2008 | Inuzuka et al. ............... | 345/102 |
| 2011/0157237 | A1 | 6/2011 | Chen et al. | |

(Continued)

FOREIGN PATENT DOCUMENTS

| | | |
|---|---|---|
| JP | 2008-249861 | 10/2008 |
| JP | 2009-128608 | 6/2009 |

(Continued)

OTHER PUBLICATIONS

"GPU-Based Local-Dimming for Power Efficient Imaging"; Intel Publication; 2012; http://www.ivda.uni-saarland.de/fileadmin/publications/2012/sig-asia-brief.pdf; printed from internet Aug. 22, 2013; 6 pages.

(Continued)

*Primary Examiner* — Stephen Sherman (57) ABSTRACT

Apparatus and methods scale a backlight of a display. A graphics processing unit (GPU) is configured to calculate a histogram. A central processing unit (CPU) is configured to control the backlight of the display responsive to a backlight level that is based on the histogram.

20 Claims, 6 Drawing Sheets

(56) References Cited

U.S. PATENT DOCUMENTS

2011/0157248 A1 6/2011 Kang et al.
2012/0086684 A1 4/2012 Ichioka et al.

FOREIGN PATENT DOCUMENTS

| JP | 2012-044608 A | 3/2012 |
| KR | 10-20090040681 A | 4/2009 |

OTHER PUBLICATIONS

International Search Report dated Dec. 2, 2013 in connection with International Patent Application No. PCT/KR2013/007632, 3 pages.
Written Opinion of International Searching Authority dated Dec. 2, 2013 in connection with International Patent Application No. PCT/KR2013/007632, 12 pages.

* cited by examiner

HIDDEN MENU STYLE FOR PARAMETER SETTING

TOOLBAR STYLE FOR
PARAMETER SETTING
808

TRIANGLE GUI STYLE FOR
PARAMETER SETTING
810

FIG. 8

GPU-BASED LCD DYNAMIC BACKLIGHT SCALING

CROSS-REFERENCE TO RELATED APPLICATION(S) AND CLAIM OF PRIORITY

The present application claims priority to U.S. Provisional Patent Application Ser. No. 61/693,151, filed Aug. 24, 2012, entitled "GPU-BASED LCD DYNAMIC BACKLIGHT SCALING FOR MOBILE SYSTEMS". The content of the above-identified patent document is incorporated herein by reference.

TECHNICAL FIELD

The present application relates generally to backlight scaling and, more specifically, to GPU-based backlight scaling.

BACKGROUND

LCD dynamic backlight scaling, or dynamic luminance scaling, dynamic backlight dimming, and the like, is an efficient method to reduce LCD power consumption without hurting a user's perception. Many backlight scaling algorithms have been proposed with different trade-offs between power reduction and computational complexity.

Previous backlight scaling algorithms focus on distortion calculation and color compensation, but do not focus on histogram generation. In statistics, a histogram is a graphical representation showing a visual impression of a distribution of data. A histogram comprises tabular frequencies, shown as adjacent rectangles, erected over discrete intervals, also referred to as bins, with an area equal to the frequency of the observations in the interval. The height of a rectangle is also equal to the frequency density of the interval. Histograms are usually used to plot density of data, which is related to the size and color channel of the data.

In practice, real-time histogram generation, that is, a histogram generated at the same time when the display content updates on the display, is conducted by an application specific integrated circuit (ASIC). This approach requires an extra hardware component, the ASIC, and is not suitable for cost sensitive platforms, including smartphones and tablets. For video applications, histogram generation can be performed before the video is presented on the display in the video encoding stage with the histogram embedded as part of the video bit-stream. However, this approach does not work for many applications with display content generated by user's input, such as video games and web browsing. As a result, LCD dynamic backlight scaling is still rare in mobile systems such as smartphones and tablets. With the increase of video resolution and quality (UHD resolution and 14-bit color depth per channel), the generation of a histogram takes more computational time and power (See Table 1) and becomes more and more challenging for cost and power sensitive systems, such as mobile systems.

TABLE 1

| Computation time for histogram generation | | | | |
|---|---|---|---|---|
| | Video Data | | | |
| | 720p | 1080p | UHD | UHD (14-bit) |
| CPU Computation Time | 69 milliseconds | 205 milliseconds | 680 milliseconds (estimated) | 1150 milliseconds (estimated) |
| of Histogram Generation Power Consumption | 850 milliwatts | 1185 milliwatts | 1185 milliwatts (saturated) | 1185 milliwatts (saturated) |

SUMMARY

An apparatus is configured to scale a backlight of a display is provided. The apparatus includes a graphics processing unit (GPU) and a central processing unit (CPU). The GPU is configured to calculate a histogram. The CPU is configured to control the backlight of the display responsive to a backlight level that is based on the histogram.

A method to scale a backlight of a display is provided. A histogram is calculated, via a graphics processing unit (GPU). The backlight of the display is controlled, via a central processing unit (CPU), responsive to a backlight level that is based on the histogram.

A computer readable medium comprising program instructions to scale a backlight of a display is provided. When the program instructions are executed by processing circuitry, the program instructions are configured to cause the processing circuitry to calculate, via a graphics processing unit (GPU), a histogram. The program instructions are further configured to cause the processing circuitry to control, via a central processing unit (CPU), a backlight of a display responsive to a backlight level that is based on the histogram.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged cellular system.

Embodiments of the present disclosure enable cost sensitive platforms, such as smartphones and tablets, to adjust LCD backlight level based on the display content. The embodiments leverage Graphic-Processing-Unit (GPU) to generate pixel value histogram of the display content in real time, calculate the LCD backlight level based on the pixel value histogram, and adjust the backlight level accordingly.

Although disclosed in the context of a mobile system, the methods and apparatus of the disclosure are applicable to other computing systems with LCDs as their displays, for example, desktops, workstations, and the like.

Figure 1:
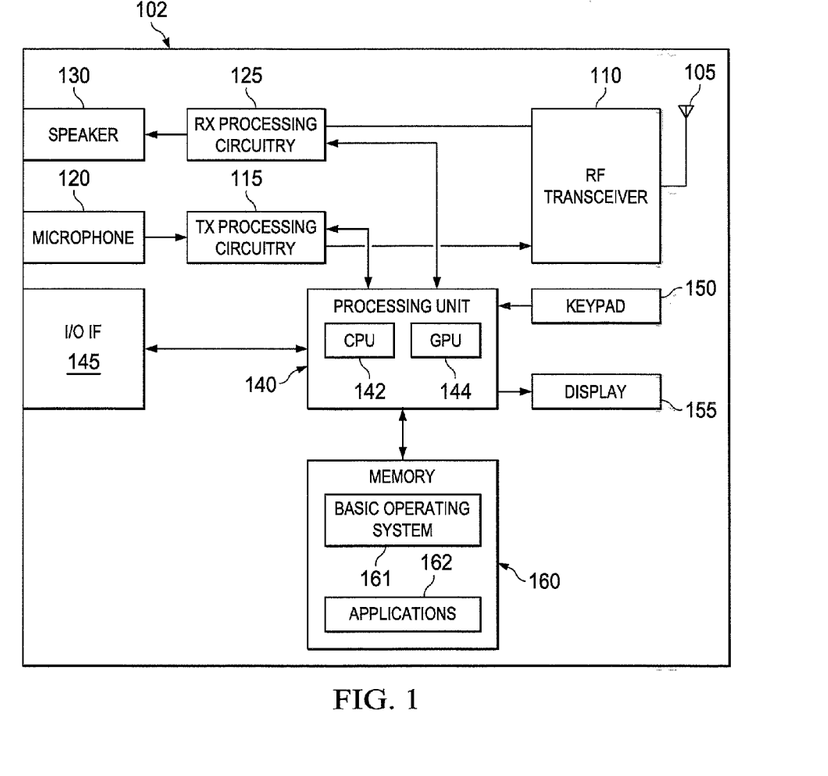
FIG. 1 illustrates a mobile station according to embodiments of the present disclosure.

FIG. 1 illustrates a mobile station according to embodiments of the present disclosure. The embodiment of a mobile station (MS) shown in FIG. 1 is for illustration only. Other embodiments of the MS could be used without departing from the scope of this disclosure.

MS 102 includes antenna 105, radio frequency (RF) transceiver 110, transmit (TX) processing circuitry 115, microphone 120, and receive (RX) processing circuitry 125. MS 102 also comprises speaker 130, processing unit 140, input/output (I/O) interface (IF) 145, keypad 150, display 155, and memory 160. Processing unit 140 includes processing circuitry configured to execute a plurality of instructions stored either in memory 160 or internally within processing unit 140. Memory 160 further comprises basic operating system (OS) program 161 and a plurality of applications 162.

Radio frequency (RF) transceiver 110 receives from antenna 105 an incoming RF signal transmitted by a base station of wireless network 100. Radio frequency (RF) transceiver 110 down-converts the incoming RF signal to produce an intermediate frequency (IF) or a baseband signal. The IF or baseband signal is sent to receiver (RX) processing circuitry 125 that produces a processed baseband signal by filtering, decoding, and/or digitizing the baseband or IF signal. Receiver (RX) processing circuitry 125 transmits the processed baseband signal to speaker 130 (i.e., voice data) or to processing unit 140 for further processing (e.g., web browsing).

Transmitter (TX) processing circuitry 115 receives analog or digital voice data from microphone 120 or other outgoing baseband data (e.g., web data, e-mail, interactive video game data) from processing unit 140. Transmitter (TX) processing circuitry 115 encodes, multiplexes, and/or digitizes the outgoing baseband data to produce a processed baseband or IF signal. Radio frequency (RF) transceiver 110 receives the outgoing processed baseband or IF signal from transmitter (TX) processing circuitry 115. Radio frequency (RF) transceiver 110 up-converts the baseband or IF signal to a radio frequency (RF) signal that is transmitted via antenna 105.

In certain embodiments, processing unit 140 comprises a central processing unit (CPU) 142 and a graphics processing unit (GPU) 144 embodied in one or more discrete devices. Memory 160 is coupled to processing unit 140. According to some embodiments of the present disclosure, part of memory 160 comprises a random access memory (RAM) and another part of memory 160 comprises a Flash memory, which acts as a read-only memory (ROM).

In certain embodiments, memory 160 is a computer readable medium that comprises program instructions to scale a backlight of display 155. When the program instructions are executed by processing unit 140, the program instructions are configured to cause one or more of processing unit 140, CPU 142, and GPU 144 to execute various functions and programs in accordance with embodiments of the present disclosure. According to some embodiments of the present disclosure, CPU 142 and GPU 144 are comprised as one or more integrated circuits disposed on one or more printed circuit boards.

Processing unit 140 executes basic operating system (OS) program 161 stored in memory 160 in order to control the overall operation of wireless mobile station 102. In one such operation, processing unit 140 controls the reception of forward channel signals and the transmission of reverse channel signals by radio frequency (RF) transceiver 110, receiver (RX) processing circuitry 125, and transmitter (TX) processing circuitry 115, in accordance with well-known principles.

Processing unit 140 is capable of executing other processes and programs resident in memory 160, such as operations for determining a backlight level as described in embodiments of the present disclosure. Processing unit 140 can move data into or out of memory 160, as required by an executing process. In certain embodiments, the processing unit 140 is configured to execute a plurality of applications 162. Processing unit 140 can operate the plurality of applications 162 based on OS program 161 or in response to a signal received from a base station. Processing unit 140 is also coupled to I/O interface 145. I/O interface 145 provides mobile station 102 with the ability to connect to other devices such as laptop computers and handheld computers. I/O interface 145 is the communication path between these accessories and processing unit 140.

Processing unit 140 is also coupled to keypad 150 and display unit 155. The operator of mobile station 102 uses keypad 150 to enter data into mobile station 102. Display 155 may be a liquid crystal display capable of rendering text and/or at least limited graphics from web sites. Alternate embodiments may use other types of displays.

Figure 2:
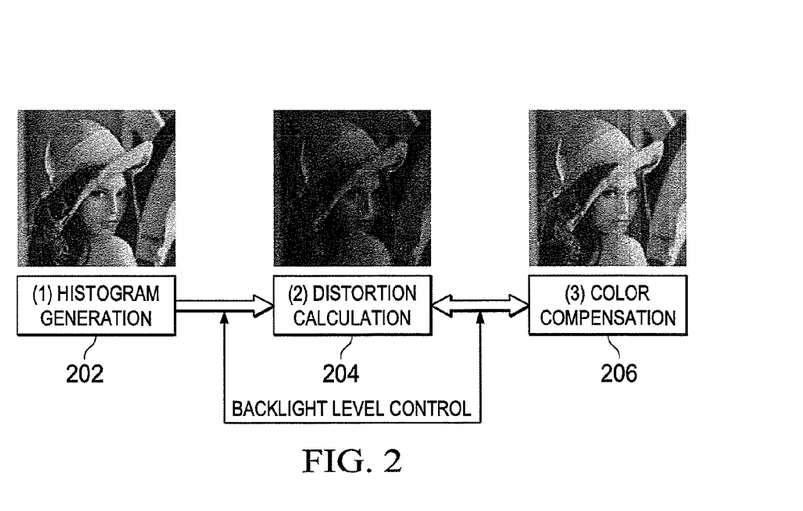
FIG. 2 illustrates a flow diagram for controlling a backlight level according to embodiments of the present disclosure.

FIG. 2 illustrates a flow diagram for controlling a backlight level according to embodiments of the present disclosure. While the flow diagram depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented in, for example, a mobile station. MS 102 can comprise one or more digital or analog processors configured to perform one or more steps depicted in the flow diagram of FIG. 2.

As shown in FIG. 2, an LCD backlight scaling algorithm includes the following three steps: histogram generation, distortion calculation, and color compensation.

Histogram Generation:

In block 202, the algorithm analyzes the display content and generates a pixel value histogram, either in grayscale, or color, which shows how many numbers of pixels have the same grayscale or RGB value in a currently displayed content or frame.

Distortion Calculation:

The algorithm chooses a new LCD backlight level and calculates the display content distortion, in block 204, introduced by using the new LCD backlight level based on the LCD display properties and the histogram generated at block 202.

Color Compensation:

The algorithm then calculates, at block 206, how much it should compensate the framebuffer data such that the distortion calculated at block 204 can be minimized. Blocks 204 and 206 can be iterated multiple times until an acceptable distortion level is achieved. Finally the LCD backlight scaling algorithm obtains an LCD backlight level.

Figure 3:
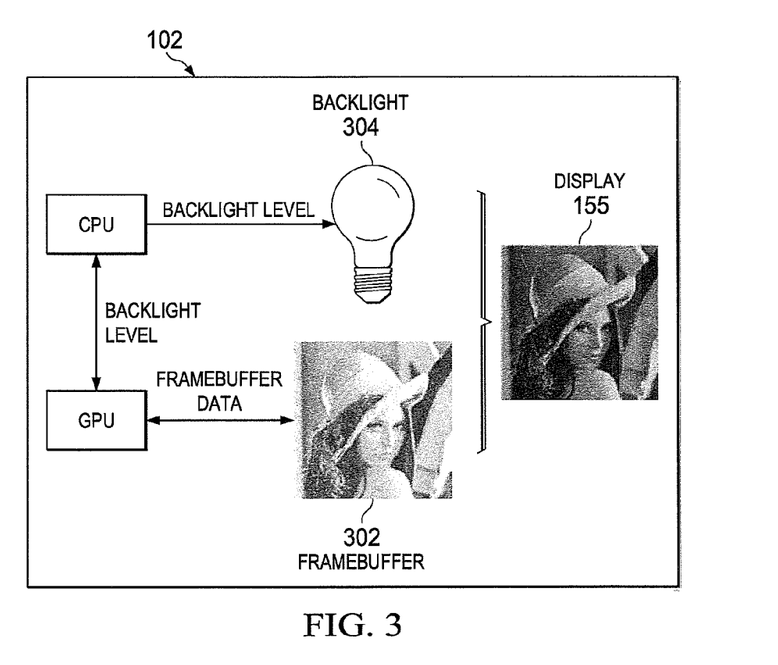
FIG. 3 illustrates an electronic device configured to dynamically adjust backlight levels according to embodiments of the present disclosure.

FIG. 3 illustrates an electronic device configured to dynamically adjust backlight levels according to embodiments of the present disclosure. The embodiment illustrated in FIG. 3 is for illustration only. Other embodiments could be used without departing from the scope of this disclosure.

As is illustrated in FIG. 3, MS 102 includes CPU 142, GPU 144, framebuffer 302, backlight 304, and display 155. CPU 142 is controls a backlight level, and GPU 144 computes and executes the three steps illustrated in FIG. 2. When MS 142 operates, GPU 144 fetches data from framebuffer 302 to perform block 202 of FIG. 2. When block 202 is completed, GPU 144 coordinates with CPU 142 to execute blocks 204 and 206 of FIG. 2.

Figure 4:
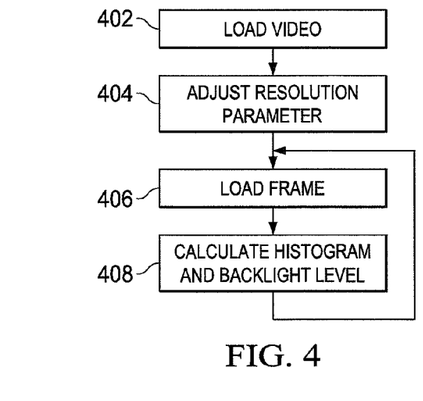
FIG. 4 illustrates a flowchart for backlight adjustment of video according to embodiments of the present disclosure.

FIG. 4 illustrates a flowchart for backlight adjustment of video according to embodiments of the present disclosure. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented in, for example, a mobile station. MS 102 can comprise one or more digital or analog processors configured to perform one or more steps depicted in the flowchart of FIG. 4.

In block 402, a video of interest is loaded. The video is selected from at least one of a video stream, a media file, and a video game that is displayed or rendered in real-time.

In block 404, a resolution parameter is adjusted to select a full resolution or to decrease the frame resolution to accelerate computation. At full resolution, each pixel is used to determine the histogram. At less than full resolution, fewer pixels are used to determine the histogram. For example, a frame resolution of 100% calculates the histogram using every pixel of an image of a video, whereas a frame resolution of 50% calculates the histogram using one out of every two pixels of an image of the video.

In block 406, a current frame of the video is loaded into a framebuffer of a GPU. The current frame is the next frame to be displayed on a display.

In block 408, the histogram is calculated using Open Graphics Library (OpenGL) and OpenGL shading language (GLSL). The backlight level is computed from the histogram. Certain embodiments can use general purpose GPU (GPGPU) oriented languages such as Compute Unified Device Architecture (CUDA) or open computing language (OpenCL).

In block 406 and 408 are repeated for each frame of the video of interest. The backlight level is adjusted for each frame of the video of interest.

Figure 5:
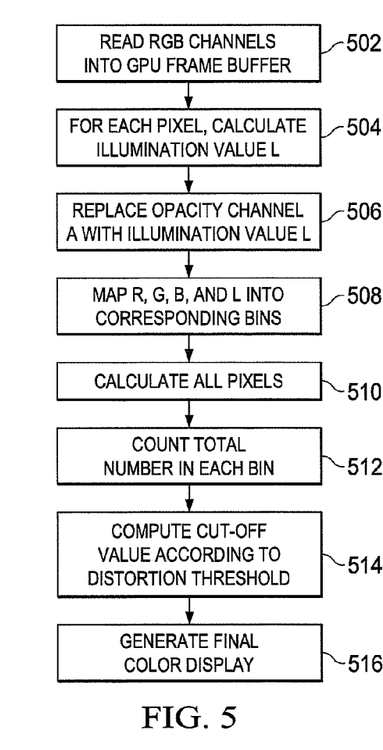
FIG. 5 illustrates a flowchart of an algorithm of GPU based histogram adjustment for the backlight adjustment according to embodiments of the present disclosure.

FIG. 5 illustrates a flowchart of an algorithm of GPU based histogram adjustment for the backlight adjustment according to embodiments of the present disclosure. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented in, for example, a mobile station. MS 102 can comprise one or more digital or analog processors configured to perform one or more steps depicted in the flowchart of FIG. 5.

In block 502, all RGB channels of a frame or image are read into a framebuffer of a GPU.

In block 504, for each pixel (with color channels RGB) in the frame in the framebuffer, an illumination value L is calculated using the scale factor, as shown by the following pseudo code:

$L(\text{illumination}) = 0.2125 \times R + 0.7154 \times G + 0.0721 \times B$ where R is a red value, G is a green value, and B is a blue value of a pixel of the frame in the framebuffer.

In block 506, an opacity channel A is replaced with illumination value L. In other words, the system maps RGBA channels into RGBL channels, as shown by the following pseudo code:

RGBA←RGBL.

Figure 6:
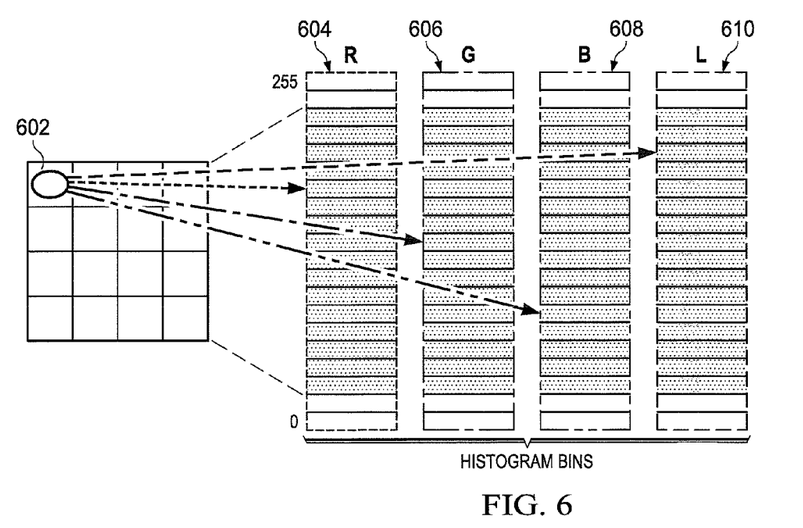
FIG. 6 illustrates a method of building a histogram according to embodiments of the present disclosure.

In block 508, the parameter bin_num (the number of histogram bins, which can be per channel) is controlled to select the value of the bin number (e.g., 32, 64, 128 or 255 bins) and then map the R, G, B and illumination value L into corresponding bins based on values of the R, G, and B channels and illumination value L, as described by FIG. 6 and shown by the following pseudo code:

index←Hashmap (value); \\ The generation of Hashmap is based on bin_num: index=value mode bin_num Hist_bin[index]←Hist_bin[index]+1;

In block 510, all pixels of current frame are calculated through the framebuffer of the GPU. In block 512, the total number is counted inside each bin.

In block 514, according to a user selected contrast distortion threshold (e.g., 5%, 10%), a cut-off value is computed that is compared with an intensity threshold. The cut-off value is based on the histogram. The intensity values that are larger than the cut-off value are treated as no contrast differences. The cut-off value is computed using the following equations:

$$\Sigma_{i=0}^{i=cut\_off} \text{bin\_No.} \geq (1 - \text{distortion\_threshold}) \times \text{total\_pixels},\qquad\text{a.}$$

while $$\Sigma_{i=0}^{i=cut\_off-1} \text{bin\_No.} < (1 - \text{distortion\_threshold}) \times \text{total\_pixels}.\qquad\text{b.}$$

In block 516, based on the cut-off value, fragment rendering is used to generate final color display by multiplying the cut-off value. The backlight level is updated based on the cut-off value.

FIG. 6 illustrates a method of building a histogram according to embodiments of the present disclosure. The embodiment illustrated in FIG. 6 is for illustration only. Other embodiments could be used without departing from the scope of this disclosure.

A red value of pixel 602 is used as an index to increment a value in a bin of red bin 604. A green value of pixel 602 is used as an index to increment a value in a bin of green bin 606. A blue value of pixel 602 is used as an index to increment a value in a bin of blue bin 608. An illumination value L of pixel 602, such as the value calculated at block 504 of FIG. 5, is used as an index to increment a value in a bin of illumination bin 610.

Figure 7:
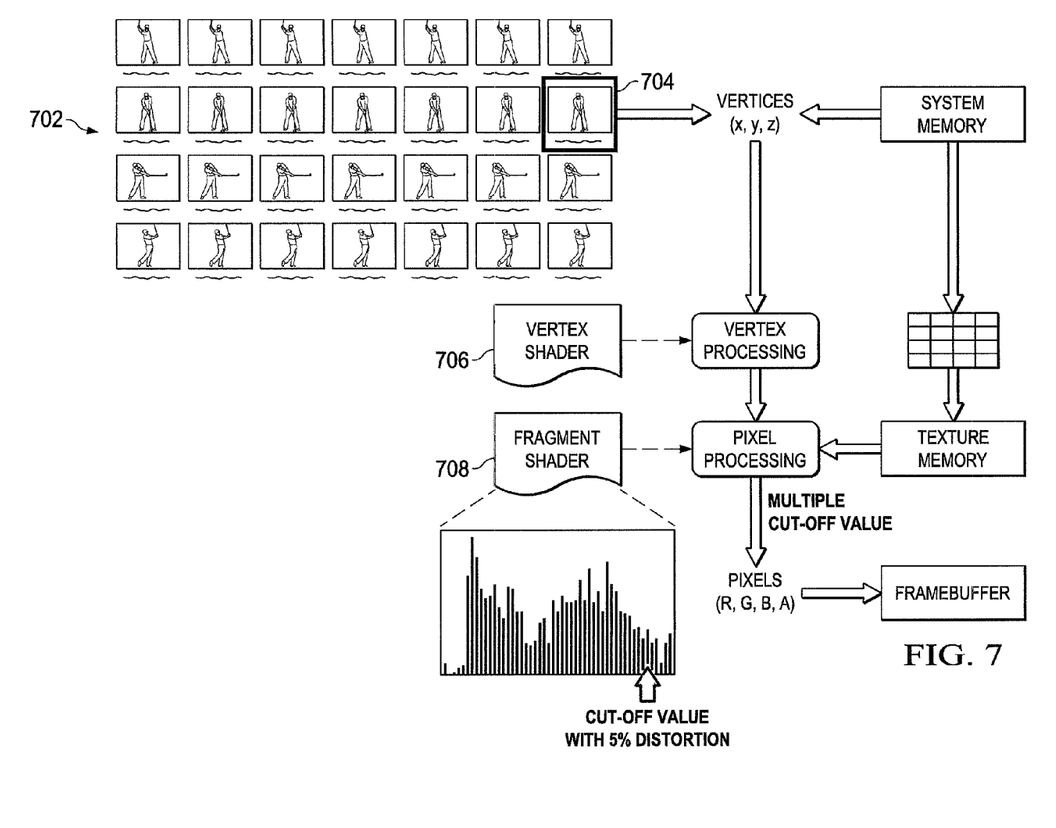
FIG. 7 illustrates a system for backlight adjustment according to embodiments of the present disclosure.

FIG. 7 illustrates a system for backlight adjustment according to embodiments of the present disclosure. The embodiment illustrated in FIG. 7 is for illustration only. Other embodiments could be used without departing from the scope of this disclosure.

Series of frames 702 are to be consecutively displayed using a backlight adjustment. The backlight adjustment for frame 704 is not processed via vertex shader 706 of a GPU, such as GPU 144 of FIG. 1. The backlight adjustment is performed via fragment shader 708 of a GPU, such as GPU 144.

GPU based implementation can significantly increase the computation speed up to 10 times compared to a CPU implementation counterpart (See Table 2), due to a GPU's parallel nature. Moreover, GPU based implementations also achieve higher energy efficiency than CPU based implementations, which is very favorable feature for battery powered devices. It is important to remember that, work is done in OpenGL and GLSL and with mobile devices, every step of the algorithm that is computed on the GPU will have to work with RGBA textures in input and output. In certain embodiments, work may be limited to 4×8 bits per pixel, which sometimes may cause precision problems.

TABLE 2

Computation time comparison for histogram generation

| Video Data | 720p | 1280p | UHD | UHD (14-bit) |
|---|---|---|---|---|
| Computation Time of Histogram Generation (CPU/GPU) | CPU: 69 milliseconds GPU: 7 milliseconds | CPU: 205 milliseconds GPU: 19 milliseconds | CPU: 680 milliseconds GPU: 58 milliseconds | CPU: 1150 milliseconds GPU: 80 milliseconds |
| Power Consumption (CPU/GPU) | CPU: 850 milliwatts GPU: 200 milliwatts | CPU: 1185 milliwatts GPU: 325 milliwatts | CPU: 1185 milliwatts GPU: 530 milliwatts | CPU: 1185 milliwatts GPU: 530 milliwatts |

Figure 8:
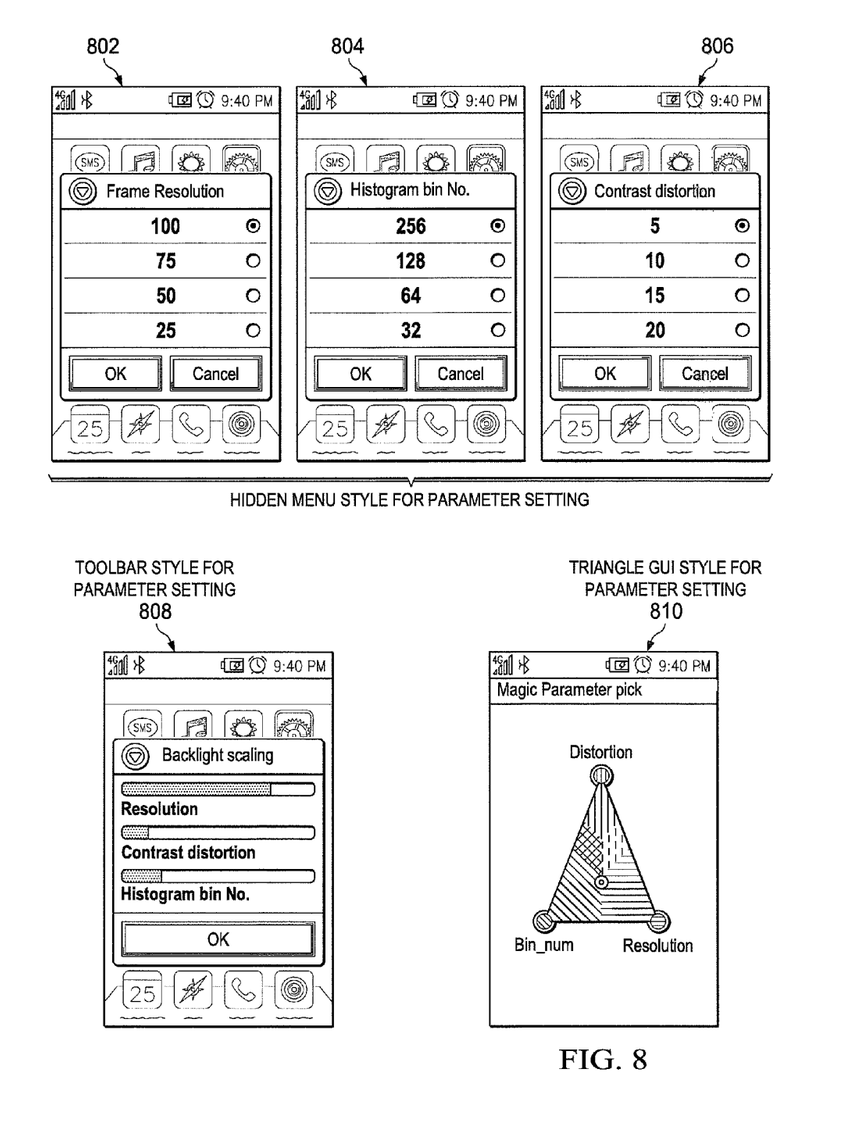
FIG. 8 illustrates graphical user interfaces used to control a backlight level adjustment according to embodiments of the present disclosure.

FIG. 8 illustrates graphical user interfaces used to control a backlight level adjustment according to embodiments of the present disclosure. GUIs 802-810 can be displayed on display 155 of MS 102 of FIG. 1. The embodiment illustrated in FIG. 8 is for illustration only. Other embodiments could be used without departing from the scope of this disclosure.

A user can control three parameters for adjusting the tradeoff between the image quality and power/computation consumption: resolution, histogram bin number, and contrast distortion.

Frame resolution is used to set the video resolution, wherein a selected value of 100 indicates that computations will be performed on all pixels of a frame. Lower values of resolution indicate that computations will be performed on a smaller number of pixels of each frame, increasing computing speed and decreasing power consumption. A selected value of 75 indicates computations will be performed on three out of every four or 75% of pixels. A selected value of 50 indicates computations will be performed on one out of every two or 50% of pixels. A selected value of 25 indicates computations will be performed on one out of every four or 25% of pixels.

Histogram bin number can be set to control the granularity of the frame with maximal density distribution range of 256 (0-255). A smaller bin number decreases the ability to differentiate between colors, but increases computing speed. A selected value of 128 indicates 128 shades or levels of each of red, green, blue, and illumination are used. A selected value of 64 indicates 64 shades or levels of each of red, green, blue, and illumination are used. A selected value of 32 indicates 32 shades or levels of each of red, green, blue, and illumination are used.

Contrast distortion is used to adjust the display content distortion introduced by using the new LCD backlight level based on the LCD display properties and the generated histogram. A smaller contrast distortion value shows better color discrimination of frame but with higher power consumption during the display. A selected value of 5 indicates the use of a 5% threshold to determine acceptable contrast distortion. A selected value of 10 indicates the use of a 10% threshold to determine acceptable contrast distortion. A selected value of 15 indicates the use of a 15% threshold to determine acceptable contrast distortion. A selected value of 20 indicates the use of a 20% threshold to determine acceptable contrast distortion.

By tuning these three parameters, a user controls a tradeoff among perception, power reduction, and computational complexity. FIG. 8 shows a few examples of user interfaces on mobile systems for the user to adjust the parameters. GUIs 802-806 depict a menu style GUI for selecting values. GUI 808 depicts a toolbar style GUI for selecting values. GUI 810 depicts a triangle style GUI for selecting values.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus configured to scale a backlight of a display, the apparatus comprising:
   the display;
   a graphics processing unit (GPU) configured to:
     calculate a histogram of pixel values of display content, wherein the display content includes an opacity channel, and wherein the histogram includes a bin for the opacity channel,
     calculate an illumination value L for each pixel of a frame in a framebuffer, and
     replace the opacity channel with the illumination value L; and
   a central processing unit (CPU) configured to control the backlight of the display responsive to a backlight level that is based on the histogram.

2. The apparatus of claim 1, wherein:
   the GPU comprises the framebuffer, the framebuffer configured to read in red, green, and blue color channels of the frame; and
   the GPU is further configured to: for each pixel of the frame that includes a red value, a green value, and a blue value read into the framebuffer, calculate the illumination value L using the red, green, and blue values of the pixel.

3. The apparatus of claim 1, wherein the illumination value L is calculated using the equation:

$$L(\text{illumination})=0.2125 \times R+0.7154 \times G+0.0721 \times B$$

R is a red value of a pixel of the frame, G is a green value of the pixel, and B is a blue value of the pixel.

4. The apparatus of claim 3, further comprising the GPU configured to:
calculate an index based on a value of the pixel; and
update a bin of the histogram via the index.

5. An apparatus configured to scale a backlight of a display, the apparatus comprising:
the display;
a graphics processing unit (GPU) configured to:
calculate a histogram,
calculate an illumination value L for each pixel of a frame in a framebuffer,
store the illumination value L in an opacity channel, wherein the illumination value L is calculated using the equation:

$$L(\text{illumination})=0.2125 \times R+0.7154 \times G+0.0721 \times B$$

wherein R is a red value of a pixel of the frame, G is a green value of the pixel, and B is a blue value of the pixel,
calculate an index based on a value of the pixel,
update a bin of the histogram via the index;
compute a cut-off value based on a selected contrast distortion threshold and the histogram, and
compare the cut-off value with an intensity threshold; and
a central processing unit (CPU) configured to control the backlight of the display responsive to a backlight level that is based on the histogram.

6. The apparatus of claim 5, further comprising:
the GPU configured to generate a final color display by multiplying the cut-off value with original pixel values; and
the CPU configured to update the backlight level based on the cut-off value.

7. A mobile station configured to scale a backlight of a display, the mobile station comprising:
the display;
a graphics processing unit (GPU) configured to calculate a histogram; and
a central processing unit (CPU) configured to control the backlight of the display responsive to a backlight level that is based on the histogram,
wherein a frame resolution is selected to indicate a percentage of pixels of the frame on which the histogram is based,
a histogram bin number is selected to indicate a number of bins used to calculate the histogram,
a contrast distortion threshold is selected to indicate an allowable amount of contrast distortion, and
the frame resolution, the histogram bin number, and the contrast distortion threshold are selected via one of a menu style graphical user interface (GUI), a toolbar style GUI, and a triangle style GUI.

8. A method to scale a backlight of a display, the method comprising:
calculating, via a graphics processing unit (GPU), a histogram of pixel values of display content, wherein the display content includes an opacity channel, and wherein the histogram includes a bin for the opacity channel;
calculating an illumination value L for each pixel of a frame in a framebuffer, and
replacing the opacity channel with the illumination value L; and
controlling, via a central processing unit (CPU), the backlight of the display responsive to a backlight level that is based on the histogram.

9. The method of claim 8, wherein the GPU comprises the framebuffer, the method further comprising:
reading in, by the framebuffer, red, green, and blue color channels of the frame;
for each pixel of the frame that includes a red value, a green value, and a blue value read into the framebuffer, calculating the illumination value L using the red, green, and blue values of the pixel.

10. The method of claim 8, wherein the illumination value L is calculated using the equation:

$$L(\text{illumination})=0.2125 \times R+0.7154 \times G+0.0721 \times B,$$

R is a red value of a pixel of the frame, G is a green value of the pixel, and B is a blue value of the pixel.

11. The method of claim 10, further comprising:
calculating, via the GPU, an index based on a value of the pixel; and
updating, via the GPU, a bin of the histogram via the index.

12. A method to scale a backlight of a display, the method comprising:
calculating, via a graphics processing unit (GPU), a histogram; and
calculating, via the GPU, an illumination value L for each pixel of a frame in a framebuffer; and
storing, via the GPU, the illumination value L in an opacity channel, wherein the illumination value L is calculated using the equation:

$$L(\text{illumination})=0.2125 \times R+0.7154 \times G+0.0721 \times B,$$

wherein R is a red value of a pixel of the frame, G is a green value of the pixel, and B is a blue value of the pixel;
calculating, via the GPU, an index based on a value of the pixel;
updating, via the GPU, a bin of the histogram via the index;
computing, via the GPU, a cut-off value based on a selected contrast distortion threshold and the histogram;
comparing, via the GPU, the cut-off value with an intensity threshold; and
controlling, via a central processing unit (CPU), the backlight of the display responsive to a backlight level that is based on the histogram.

13. The method of claim 12, further comprising:
generating, via the GPU, a final color display by multiplying the cut-off value with original pixel values; and
updating the backlight level based on the cut-off value.

14. A method to scale a backlight of a display, the method comprising:
calculating, via a graphics processing unit (GPU), a histogram;
controlling, via a central processing unit (CPU), the backlight of the display responsive to a backlight level that is based on the histogram, wherein:
the display, GPU, and CPU are comprised by a mobile station,
a frame resolution is selected to indicate a percentage of pixels of the frame on which the histogram is based,
a histogram bin number is selected to indicate a number of bins used to calculate the histogram,
a contrast distortion threshold is selected to indicate an allowable amount of contrast distortion, and
the frame resolution, the histogram bin number, and the contrast distortion threshold are selected via one of a menu style graphical user interface (GUI), a toolbar style GUI, and a triangle style GUI.

15. A non-transitory computer readable medium comprising program instructions to scale a backlight of a display, wherein when the program instructions are executed by a processing unit, the program instructions cause the processing unit to:
- calculate, via a graphics processing unit (GPU), a histogram of pixel values of display content, wherein the display content includes an opacity channel, and wherein the histogram includes a bin for the opacity channel;
- calculate an illumination value L for each pixel of a frame in a framebuffer; and
- replace the opacity channel with the illumination value L; and
- control, via a central processing unit (CPU), a backlight of a display responsive to a backlight level that is based on the histogram.

16. The non-transitory computer readable medium of claim 15, wherein the GPU comprises the framebuffer, and wherein the program instructions, when executed by the processing unit, cause the processing unit to:
- read in, via the framebuffer, red, green, and blue color channels of the frame;
- for each pixel of the frame that includes a red value, a green value, and a blue value read into the framebuffer, calculate, via the GPU, the illumination value L using the red, green, and blue values of the pixel.

17. The non-transitory computer readable medium of claim 15, wherein the illumination value L is calculated using the equation:

$$L(\text{illumination}) = 0.2125 \times R + 0.7154 \times G + 0.0721 \times B$$

R is a red value of a pixel of the frame, G is a green value of the pixel, and B is a blue value of the pixel.

18. The non-transitory computer readable medium of claim 17, wherein the program instructions, when executed by the processing unit, to cause the processing unit to:
- calculate, via the GPU, an index based on a value of the pixel; and
- update, via the GPU, a bin of the histogram via the index.

19. A non-transitory computer readable medium comprising program instructions to scale a backlight of a display, wherein when the program instructions are executed by a processing unit, the program instructions cause the processing unit to:
- calculate, via a graphics processing unit (GPU), a histogram;
- calculate, via the GPU, an illumination value L for each pixel of a frame in a framebuffer;
- store, via the GPU, the illumination value L in an opacity channel, wherein the illumination value L is calculated using the equation:

$$L(\text{illumination}) = 0.2125 \times R + 0.7154 \times G + 0.0721 \times B$$

wherein R is a red value of a pixel of the frame, G is a green value of the pixel, and B is a blue value of the pixel;
- calculate, via the GPU, an index based on a value of the pixel;
- update, via the GPU, a bin of the histogram via the index;
- compute, via the GPU, a cut-off value based on a selected contrast distortion threshold and the histogram;
- compare, via the GPU, the cut-off value with an intensity threshold; and
- control, via a central processing unit (CPU), a backlight of a display responsive to a backlight level that is based on the histogram.

20. The non-transitory computer readable medium of claim 19, wherein the program instructions, when executed by the processing unit, cause the processing unit to:
- generate, via the GPU, a final color display by multiplying the cut-off value with original pixel values; and
- update the backlight level based on the cut-off value.

* * * * *